Figure 1:
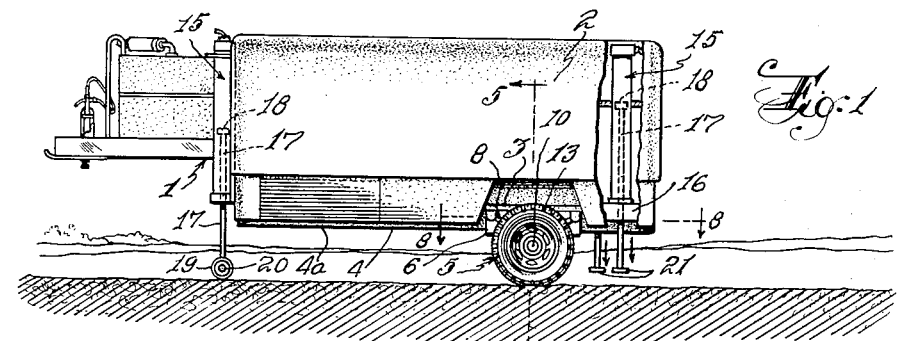

June 19, 1956

K. W. COUSE 2,751,234

MEANS FOR REDUCING THE OVERALL HEIGHT
OF A MOTOR VEHICLE TRAILER

Filed April 5, 1952

4 Sheets-Sheet 1

Inventor:
Kibbey W. Couse.

BY

Attorney.

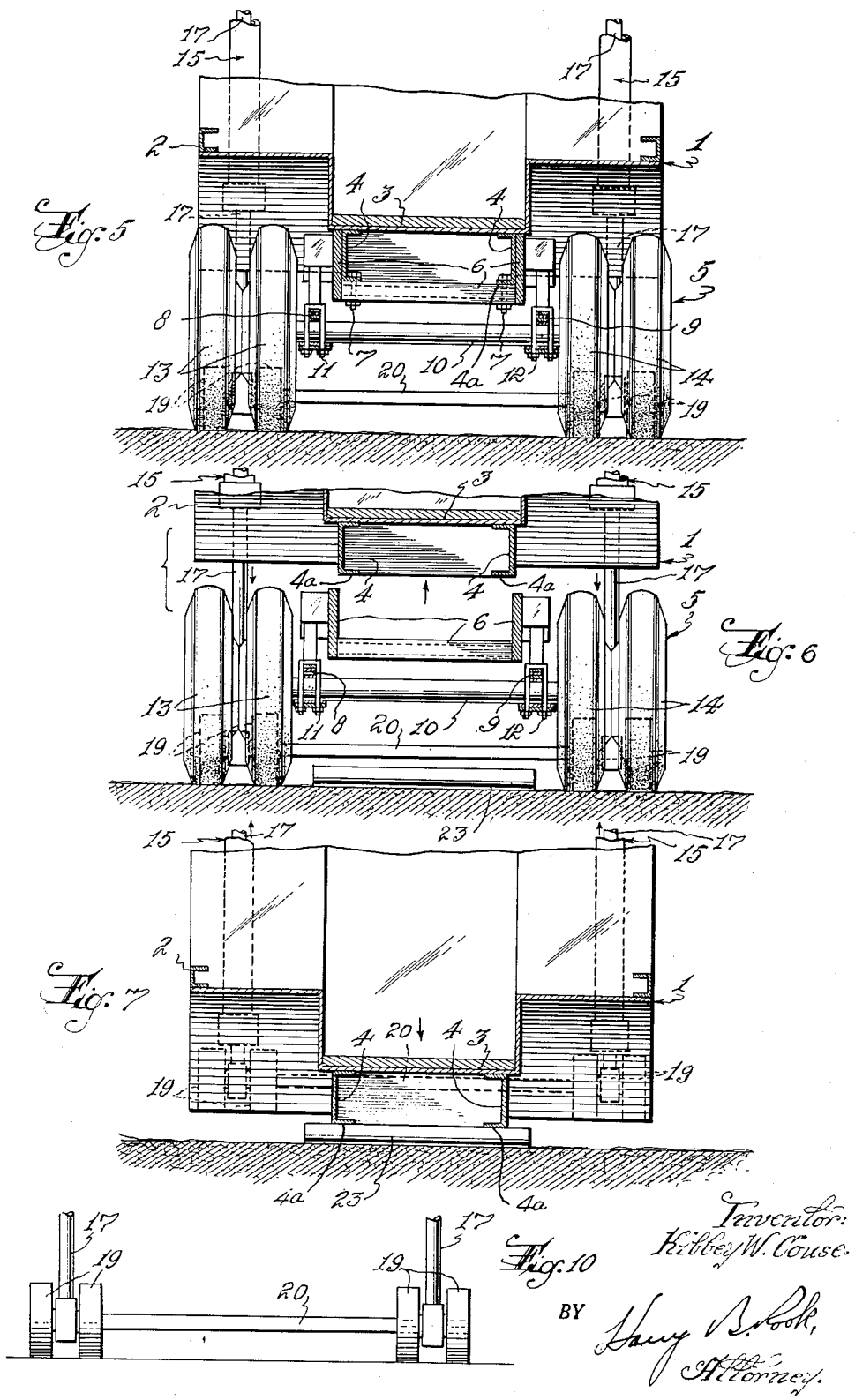

June 19, 1956
K. W. COUSE
2,751,234
MEANS FOR REDUCING THE OVERALL HEIGHT
OF A MOTOR VEHICLE TRAILER
Filed April 5, 1952
4 Sheets-Sheet 3
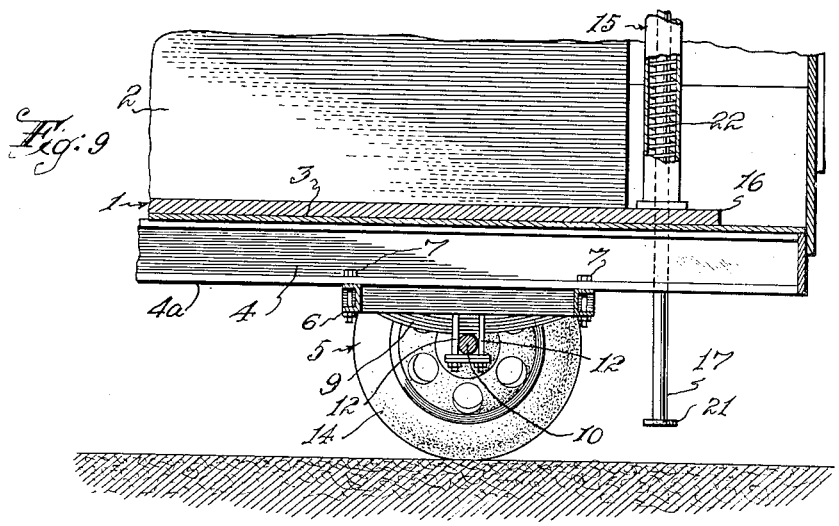
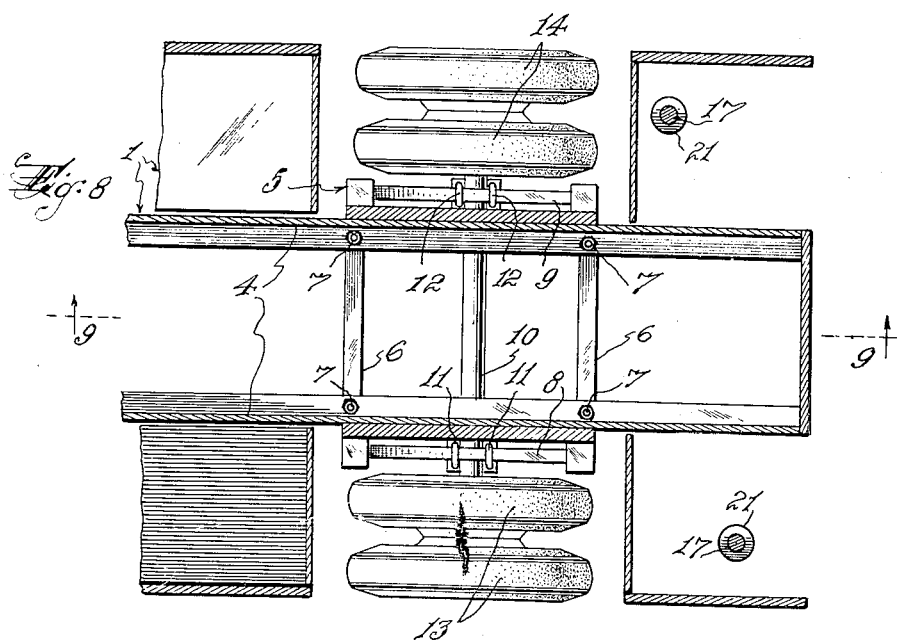
Inventor:
Kibbey W. Couse
BY
Harry A. Rook,
Attorney.

June 19, 1956  K. W. COUSE  2,751,234
MEANS FOR REDUCING THE OVERALL HEIGHT
OF A MOTOR VEHICLE TRAILER
Filed April 5, 1952  4 Sheets-Sheet 4
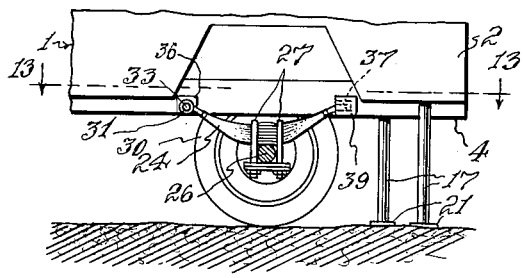
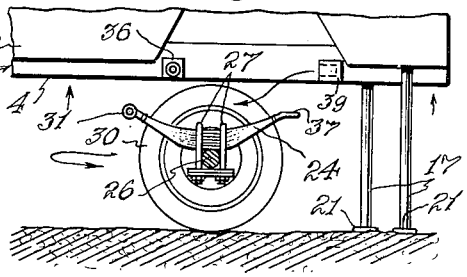
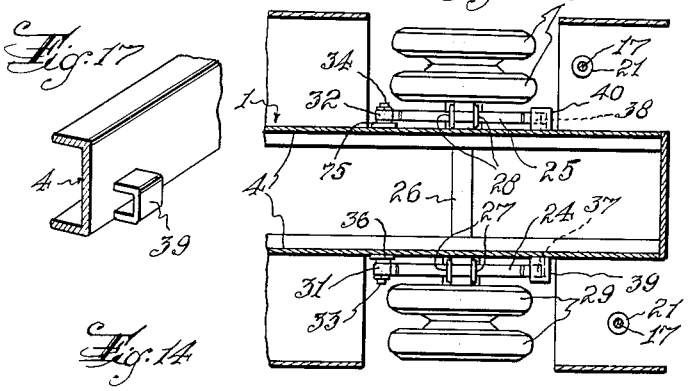
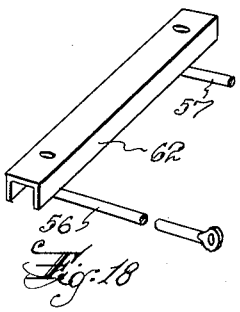
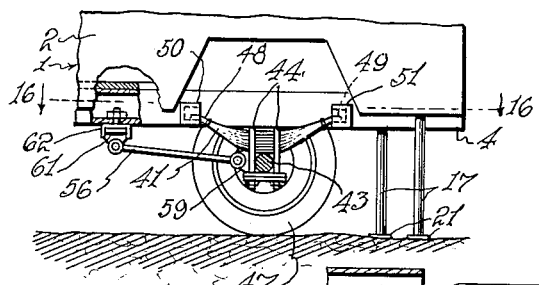
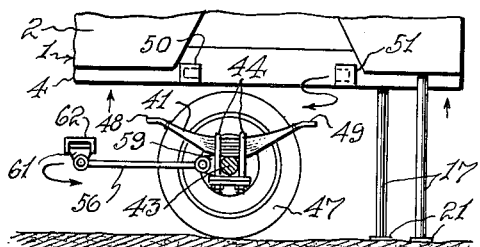
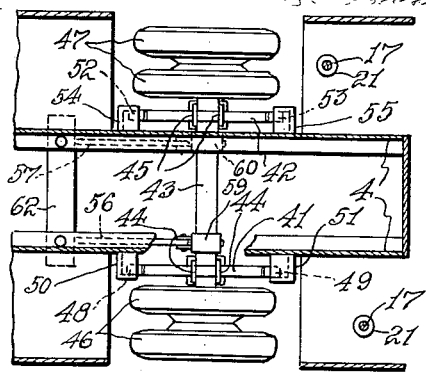
Inventor:
Kibbey W. Couse
BY Harry N. Cook
Attorney.

United States Patent Office 2,751,234
Patented June 19, 1956

2,751,234

MEANS FOR REDUCING THE OVERALL HEIGHT OF A MOTOR VEHICLE TRAILER

Kibbey W. Couse, Newark, N. J., assignor to Reconstruction Finance Corporation, New York, N. Y., a corporation of the United States Application April 5, 1952, Serial No. 280,735

5 Claims. (Cl. 280—44)

My invention relates to motor vehicle trailers, and more particularly, to means for reducing the overall height of a motor vehicle trailer.

In the transportation of goods, considerable time is lost when it becomes necessary to transfer goods en-route from one type of conveyance to another. Assume, for example, that goods are to be transported over one leg of the journey by truck and over another portion of the journey by plane. Obviously, it would be desirable if the time consumed in unloading the goods from the truck and reloading them on to the plane could be saved.

Accordingly, it is a prime object of my invention to provide a motor vehicle trailer with means for raising the trailer from the ground to permit removal of its running gear therefrom and for lowering the trailer after such removal thereby reducing its overall height to render the trailer suitable for loading onto a plane or other transport having limited head room so that the trailer can be transported thereby.

It is another object of my invention to provide a trailer which is to have its height reduced in the aforesaid manner with novel and improved means for facilitating the removal of its running gear from the trailer chassis.

Other objects and advantages of my invention will become apparent as the course of the specification progresses.

To attain the objects and advantages of my invention, I provide a motor vehicle trailer having a removable truck with a plurality of jacks, such jacks having fixed elements secured upon the trailer and other elements movable with respect to the fixed elements, which movable elements are operable in one direction to raise the trailer from the ground permitting removal of the running gear from the chassis and operable in the other direction to lower the trailer after such removal to reduce its overall height. I also provide several forms of running gear for the trailer specially adapted to facilitate removal of the running gear from the trailer chassis which running gear is, of course, associated with cooperating elements secured to the trailer chassis.

Figure 2:
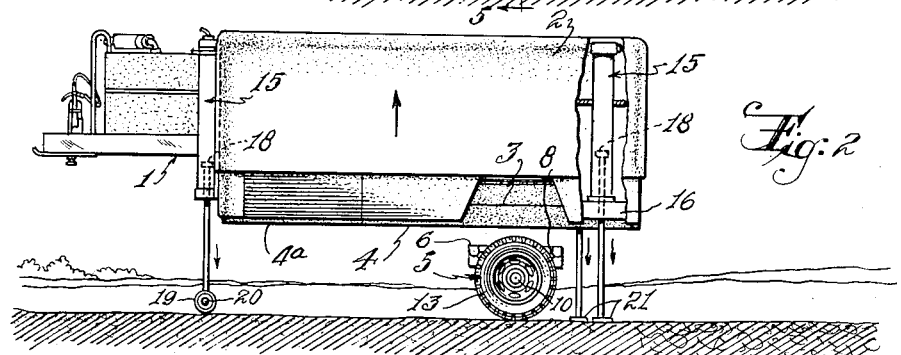
Figure 3:
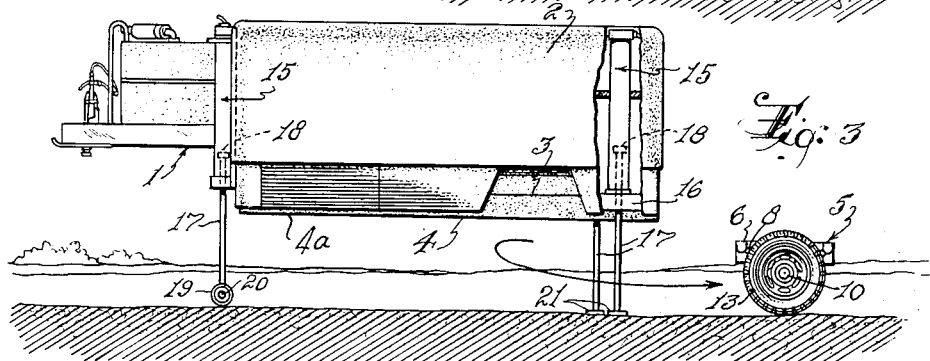
Figure 4:
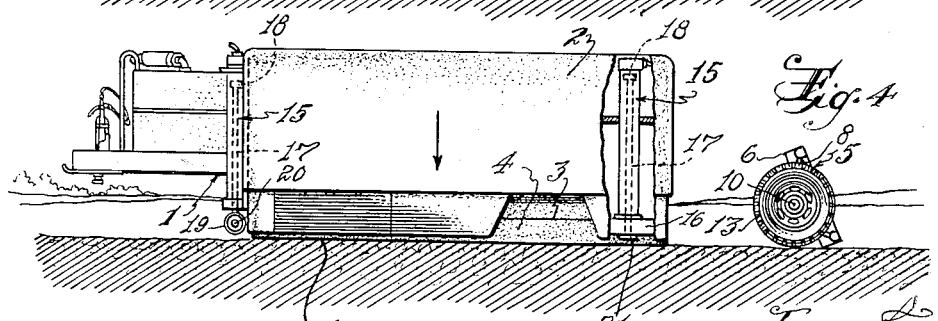

In the accompanying drawings, Figs. 1 to 4 are side elevational views more or less diagrammatic, depicting the manner of reducing the overall height of the trailer. Fig. 1 shows the trailer preparatory to its being lifted from the ground. Fig. 2 shows the trailer body and chassis in a raised position with the running gear disconnected from the chassis. Fig. 3 shows the trailer body and chassis in the same position as Fig. 2 but with the running gear having been moved out from under the chassis. Fig. 4 shows the trailer body and chassis resting on the ground. Figs. 5 to 7 are transverse vertical sectional views taken along the line 5—5 of Fig. 1, also depicting the manner in which the trailer height is reduced. The position of the trailer in views 5, 6 and 7 correspond to the positions of the trailer as shown in Figs. 1, 2 and 4 respectively. Fig. 8 is a transverse horizontal sectional view taken on the line 8—8 of Fig. 1. Fig. 9 is a vertical longitudinal sectional view taken along the line 9—9 of Fig. 8. Fig. 10 is a front elevational view of rollers associated with the forward jacks of the trailer. Fig. 11 is a side elevational view of a modified form of removable running gear. Fig. 12 is a side elevational view of the running gear of Fig. 11 showing the manner of its removal from the trailer chassis. Fig. 13 is a transverse sectional view taken along the line 13—13 of Fig. 11. Fig. 14 is a side elevational view of another form of removable running gear. Fig. 15 is a side elevational view of the running gear of Fig. 14 showing the manner of its removal from the trailer chassis. Fig. 16 is a transverse sectional view taken along the line 16—16 of Fig. 14. Fig. 17 is a detail perspective view showing one of a plurality of positioning members associated with the removable running gear of Fig. 11. Fig. 18 is a detail perspective view showing certain of the elements associated with the running gear of Fig. 14.

Similar reference characters refer to similar parts in each of the several views.

I shall describe several forms of my invention and then point out the novel features thereof in claims.

Referring to the drawings (Figs. 1-10), reference character 1 designates a motor vehicle trailer having a trailer body 2 which is secured on its underside 3 to the frame or chassis 4 which has smooth bottom skid surfaces 4a as best shown in Figures 4, 6, 7 and 9. As shown in these figures, said skid surfaces are disposed in a common horizontal plane. Removably connected directly to chassis 4 is a rear truck or removable running gear 5 comprising frame 6 bolted to the chassis by bolts 7, leaf springs 8 and 9 suitably connected at opposite ends to frame 6, axle 10 secured to springs 8 and 9 by tie rods 11 and 12 respectively, and wheels 13 and 14 rotatably mounted at opposite ends of axle 10.

Mounted in an upright position on trailer 1 are a plurality of jack cylinders 15, preferably four in number, as shown in the drawings of which two are mounted on the forward end of the trailer, the other two cylinders being mounted to the rear of truck or running gear 5 on a supporting member 16 suitably secured to the underside 3 of trailer body 2. Each jack cylinder has an actuating element 17 associated with it, which actuating element includes a piston 18 at one end reciprocable in its associated cylinder. The actuating elements of the forward cylinders are provided with a plurality of ground-engaging elements such as rollers 19, these rollers being rotatably mounted on an axle 20 which is connected to the actuating elements of the forward cylinders at their ends opposite from piston 18. Each of the actuating elements of the rear cylinders is provided at its end opposite from piston 18 with a ground-engaging or supporting pad 21. Actuating elements 17 are normally biased to predetermined positions in their associated cylinders by biasing springs 22 in which predetermined positions rollers 19 and pads 21 lie above the underside of chassis 4 (see Fig. 7). Preferably, jack cylinders 15 are all connected to a single source of hydraulic pressure suitable for operating the actuating elements 17 outwardly from cylinders 15 to raise the trailer and for thereafter controlling their inward movement as the trailer is lowered to the ground or onto rollers 23. It is preferable if the jacks can be so controlled that the forward and rear jacks may be operated independently of each other. It is to be noted that while forward cylinders 15 are disposed in the same vertical plane as viewed in Figs. 1 to 4, the rear cylinders are staggered, each of such rear cylinders being disposed in a different vertical plane to assure greater stability during the raising and lowering operations.

When the overall height of the trailer is to be reduced, actuating elements 17 are operated outwardly from their associated cylinders 13 by pressure exerted upon the pistons 18. After actuating elements 17 engage the ground, the trailer is raised permitting removal of the truck therefrom. Bolts 7 are disconnected and removable truck 5 dropped from under the trailer body. The truck is moved outward from under the trailer body and the hydraulic pressure acting upon pistons 18 is reduced permitting actuating elements 17 to recede into cylinders 15, whereupon the trailer body and chassis is lowered to the ground or onto rollers 23. The overall height of the trailer is reduced in this manner by rendering it more suitable in terms of weight and size for loading on a plane and for transportation thereby. It will be understood that while the rollers 19 and pads 21 have been denoted "ground-engaging" elements, the word "ground" is intended to include other supporting surfaces such as the floor of a compartment in an airplane or the floor of a railroad freight car as well as the ground.

A modified form of removable running gear is shown in Figs. 11, 12, and 13 comprising leaf springs 24 and 25, axle 26 secured to springs 24 and 25 by tie rods 27 and 28 respectively, and wheels 29 and 30 rotatably mounted on opposite ends of axle 26, these parts being similar to the corresponding parts of removable running gear on truck 5 already described. In this modified form of running gear, however, springs 24 and 25 have openings formed in corresponding ends 31 and 32, and holding pins 33 and 34 respectively are inserted therein. Pins 33 and 34 connect with socket members 36 and 75 respectively, the pins being held by suitable means in fixed positions in such socket members to prevent the running gear from moving longitudinally. While ends 31 and 32 are pivotally connected to chassis 4 in the foregoing manner, springs 24 and 25 have their other ends 37 and 38 flattened for insertion into positioning members 39 and 40 respectively which are secured upon the channel chassis 4 (Figs. 11, 12, 13 and 17), ends 37 and 38 being positioned in said positioning members where they are restrained by the upper and lower sides therof against any substantial vertical movement. When it becomes desirable to disconnect the running gear, it is merely necessary after the trailer has been raised to remove holding pins 33 and 34 and to slide spring ends 37 and 38 forwardly out of positioning members 39 and 40, whereupon the running gear may be dropped to the ground or moved out from under the trailer chassis.

Another form of removable running gear is shown in Figs. 14, 15, 16 and 18, which form also includes the usual leaf springs herein designated by reference characters 41 and 42, an axle 43 secured to springs 41 and 42 by tie rods 44 and 45 respectively, and wheels 46 and 47 rotatably mounted on opposite ends of axle 43. Spring 41 has its opposite flattened ends 48 and 49 supported in positioning members 50 and 51 respectively, which members are secured in a suitable manner upon chassis 4. The other spring 42 has its opposite ends 52 and 53 supported in positioning members 54 and 55 secured upon chassis 4. The aforesaid positioning members serve to prevent any substantial vertical movement of the running gear. The positioning members are so disposed with respect to chassis 4 as to permit corresponding ends of springs 41 and 42 to be removed from their supporting members by moving the running gear longitudinally in one direction or the other until the extreme ends on the other corresponding ends engage the inner of their supporting members. Longitudinal movement of the running gear during its operation is restrained by rods 56 and 57 pivotally connected at one pair of corresponding ends to collars 59 and 60 respectively, which collars are secured upon axle 43 and pivotally connected at their other ends to suitable supporting members 61 which are connected to a channel 62 fixed to chassis 4. When the trailer is in its raised position, the running gear may be removed by disconnecting supporting members 61 from channel 62 and then sliding spring ends 48, 49, 52 and 53 longitudinally in their associated positioning members until one pair of corresponding spring ends are clear of the positioning members with which they are associated, whereupon the other pair of spring ends may be moved longitudinally in the opposite direction to permit the running gear to be dropped to the ground and moved out from under the trailer chassis.

It will now be apparent that I have provided a motor vehicle trailer with means suitable for raising the trailer from the ground to permit the truck to be removed therefrom and for lowering the trailer after removal of the truck to reduce the trailer's height so that it may be loaded upon the plane without occupying undue space, for example, by placing the rollers 23 under the skid surfaces of the chassis and rolling the trailer onto the plane. It will also be apparent that I have provided several forms of running gear for the trailer specially adapted to facilitate its removal from the trailer chassis.

Although I have illustrated and described only one form of my invention, it will be apparent that changes and modifications may be made therein within the scope of the apparent claims without departing from the spirit and scope of my invention.

Having thus described my invention, what I claim is:

1. In combination, a motor vehicle trailer including a chassis the bottom surfaces of which constitute skid surfaces in a common horizontal plane, a rear truck, means removably connecting said truck directly to said chassis, a pair of cylinders fixed to said trailer disposed forwardly of said truck and spaced from each other transversely of the chassis, another pair of cylinders fixed to said trailer disposed to the rear of said truck and spaced from each other transversely of the chassis, an actuating element for each cylinder including a piston reciprocable therein and a ground-engaging element connected to said piston, said actuating elements being operable in one direction to move the ground engaging elements below said plane of said skid surfaces and into contact with the ground thereby to raise the chassis to provide for removal of the rear truck from the chassis, and said actuating elements being operable in the opposite direction to move the ground-engaging elements above said plane of said skid surfaces thereby to lower the trailer to bring said skid surfaces into contact with the ground.

2. In the combination defined in claim 1, the addition of means biasing each of said actuating ground-engaging elements of said forward and rear cylinders to a predetermined position in its associated cylinder above said plane of the skid surfaces, said actuating elements of said forward and rear cylinders being operable against said biasing means in the direction to raise the trailer.

3. In the combination defined in claim 1, said ground engaging elements of the forward actuating elements comprising rollers mounted on the ends of said actuating elements and said actuating elements being operable in the second-mentioned direction to move said rollers out of contact with the ground.

4. In combination, a motor vehicle trailer having a chassis that includes a bar extending longitudinally of the trailer at each side thereof and formed with a bottom skid surface, a truck comprising a shaft, a plurality of wheels mounted thereon, a plurality of shock absorbing leaf springs and means connecting said leaf springs to said shaft; means for removably connecting said truck to said chassis including a plurality of positioning members secured upon the chassis bars, each of said members separably engaging one of the corresponding ends of said leaf springs to restrict the vertical movement of such spring end, and means for separably connecting the other ends of said leaf springs to said chassis bars to hold the truck against longitudinal movement; a plurality of jacks each having a fixed element secured on said trailer and an actuating ground-engaging element movable with respect to said fixed element in one direction to raise said trailer permitting removable of the truck therefrom and movable in another direction to lower said trailer to reduce the overall height thereof or to dispose said skid surfaces in direct contact with a support.

5. In combination, a motor vehicle trailer having a chassis with bottom skid surfaces, means demountably connecting said truck to said chassis, a plurality of jacks each having a fixed element secured on said trailer and an actuating ground-engaging element movable with respect to said fixed element in one direction to raise said trailer permitting removal of the truck therefrom and movable in another direction to lower said trailer to reduce the overall height thereof or to dispose said skid surfaces in direct contact with a support, said removable truck comprising an axle, a plurality of wheels mounted thereon, a plurality of shock absorbing leaf springs and means connecting said leaf springs to said axle; and said means for demountably connecting said truck to said chassis including a plurality of positioning members secured upon the trailer chassis, the ends of said leaf springs being inserted therein, and means removably connected to the trailer chassis and connected to said axle for restricting longitudinal movement of said truck, said positioning members being disposed on said trailer chassis to permit said spring ends to be removed from the positioning members when said removably connected means is disconnected from the trailer chassis.

References Cited in the file of this patent

UNITED STATES PATENTS

| | | |
|---|---|---|
| 1,303,854 | Clark | May 20, 1919 |
| 2,050,471 | Soulis | Aug. 11, 1936 |
| 2,304,622 | Barrett | Dec. 8, 1942 |
| 2,519,002 | Stemen et al. | Aug. 15, 1950 |
| 2,648,546 | Falkenhagen | Aug. 11, 1953 |
| 2,653,035 | Ward | Sept. 22, 1953 |